United States Patent [19]

Wilmot

[11] Patent Number: 4,695,738

[45] Date of Patent: Sep. 22, 1987

[54] ENERGY MANAGEMENT SYSTEM

[76] Inventor: Daniel Wilmot, 8005 Dennison-Ashtabula, Cortland, Ohio 44410

[21] Appl. No.: 781,946

[22] Filed: Sep. 30, 1985

[51] Int. Cl.$^4$ ............................................. H02J 3/00
[52] U.S. Cl. ...................................... 307/31; 307/38; 307/39; 361/191
[58] Field of Search ........................ 307/31, 32, 38, 39, 307/41, 34, 35; 361/166, 167, 170, 191

[56] References Cited

U.S. PATENT DOCUMENTS

| | | | |
|---|---|---|---|
| 2,712,101 | 6/1955 | Salati | 317/137 |
| 2,784,322 | 3/1957 | Johnson | 307/39 |
| 3,359,426 | 12/1967 | Burr | 307/38 |
| 4,066,913 | 1/1978 | Manning et al. | 307/38 |
| 4,168,491 | 9/1979 | Phillips et al. | 307/41 X |
| 4,216,384 | 8/1980 | Hurley | 307/39 |
| 4,310,770 | 1/1982 | Keener et al. | 307/35 |
| 4,419,589 | 12/1983 | Ross | 307/39 |
| 4,423,335 | 12/1983 | Gurr | 307/31 |
| 4,456,832 | 6/1984 | Greer et al. | 307/38 |
| 4,472,640 | 9/1984 | Elmer | 307/38 X |
| 4,520,274 | 5/1985 | Stauts | 307/41 X |

Primary Examiner—William M. Shoop, Jr.
Assistant Examiner—Sharon D. Logan
Attorney, Agent, or Firm—Wayne D. Porter, Jr.

[57] ABSTRACT

An energy management system for controlling a plurality of electrical loads having assigned priorities of use employs electronic relays to sense the flow of current in the loads. Signals from the electronic relays are used by power relays or by a combination of control relays and power relays to disable selected electrical loads. An additional control relay can be employed to prevent disabling of a selected load. A repeat cycle time delay relay can be employed to alternate disabling of selected loads.

16 Claims, 4 Drawing Figures

ENERGY MANAGEMENT SYSTEM

BACKGROUND OF THE INVENTION

1. Field of the Invention

The invention relates to energy management systems for controlling electrical loads and, more particularly, to an energy management system wherein effective energy management is obtained through the use of inexpensive, reliable components.

2. Description of the Prior Art

Energy management systems have been developed in recent years to control more effectively the consumption of electricity, particularly in residences. Some electric utilities offer more favorable rates, or at least the absence of higher rates, if electrical consumption during peak periods is kept below predetermined levels. Existing energy management systems, generally speaking, assign a priority of use to selected electrical loads such as the range, clothes dryer, water heater, electric furnace, air conditioner, and so forth. If electrical consumption exceeds a predetermined level, then the electrical loads are shed from the circuit in order of priority, the least necessary or desirable loads being shed first.

Although existing energy management systems generally function satisfactorily to accomplish their intended results, a significant concern relates to their expense. Most existing energy management systems employ relatively expensive and sophisticated components such as microprocessors. The cost of these components often places an energy management system beyond the resources of the consumer. Even when such devices are installed, it can take many months or years for their cost to be recovered.

SUMMARY OF THE INVENTION

In response to the foregoing concerns, the present invention provides a new and improved energy management system that is exceedingly effective and inexpensive. The energy management system according to the invention controls the operation of a relatively few number of electrical loads, it being determined that controlling less important electrical loads cannot justify the expense of the equipment needed to control them. In one embodiment of the invention, the selected loads to be controlled are the clothes dryer and water heater. If desired, the electric furnace also can be controlled, as well as baseboard heaters or ceiling cable heat.

The system according to the invention employs sensing means in the form of electronic relays for sensing current flow in the electrical loads and for providing an output signal in response thereto. Interrupting means are provided for interrupting current flow in selected electrical loads upon receiving an output signal from predetermined sensing means. In its simplest form, the invention employs a current sensor to detect current flowing to the electric range. The output of this current sensor controls operation of a power relay connected to the dryer. A second current sensor senses current flow in both the range and the dryer. The output of the second current sensor controls operation of a power relay connected to the water heater. Accordingly, whenever current is flowing to the range, both the dryer heating element and the water heater will be disabled. When current is flowing to the dryer, the water heater will be disabled. The current sensors and the power relays are powered by the output side of a step-down transformer.

Alternative embodiments of the invention are provided in which greater flexibility in controlling the operation of electrical loads is available. In one alternative embodiment, separate current sensors are provided for the range, dryer, and water heater. The current sensors control operation of control relays which, in turn, control operation of power relays. The power relays disable the selected appliances. In this alternative embodiment, a control relay also is provided to control operation of an electric furnace. The control relays associated with the range, dryer and water heater control operation of a furnace control relay coil such that one or more stages of the furnace are disabled whenever any one of the range, dryer, or water heater is in use. A bypass control relay is provided to enable the furnace control relay to be disabled whenever desired such that operation of the furnace will continue uninterrupted.

In an additional embodiment of the invention especially adapted for use with electric baseboard heating or ceiling cable heat, a first set of power relays is provided to disable up to four heating circuits, and a second set of power relays is provided to disable as many as four other heating circuits. A repeat cycle time delay control relay is connected across the first and second sets of power relays in order to alternate disabling of the heating circuits.

DESCRIPTION OF THE PREFERRED EMBODIMENT

Figure 1:
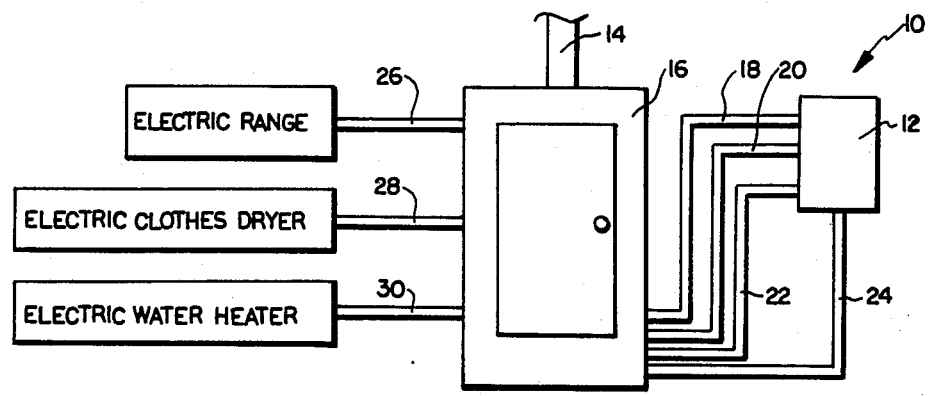
FIG. 1 is a schematic view of an electrical management system according to the invention as it might be installed in a typical residence.

Referring to FIG. 1, an energy management system according to the invention is indicated generally by the reference numeral 10. The system 10 includes various electrical and electronic components, as will be described in detail hereafter, housed within a junction box 12. A supply cable 14 provides electrical current to a panel 16 as is customarily found in residences. The panel 16 is connected to the junction box 12 by means of cables 18, 20, 22, 24. Selected electrical loads, in this instance the electric range, electric clothes dryer, and electric water heater, are connected to the panel 16 by means of cables 26, 28, 30. The circuit breaker for the electric range is connected in a loop extending through cables 18, 26, with connections being made in the box 12 and the panel 16. Similarly, the heating elements for the dryer and the water heater are connected in loops extending through cables 20, 28 and 22, 30, respectively.

Figure 2:
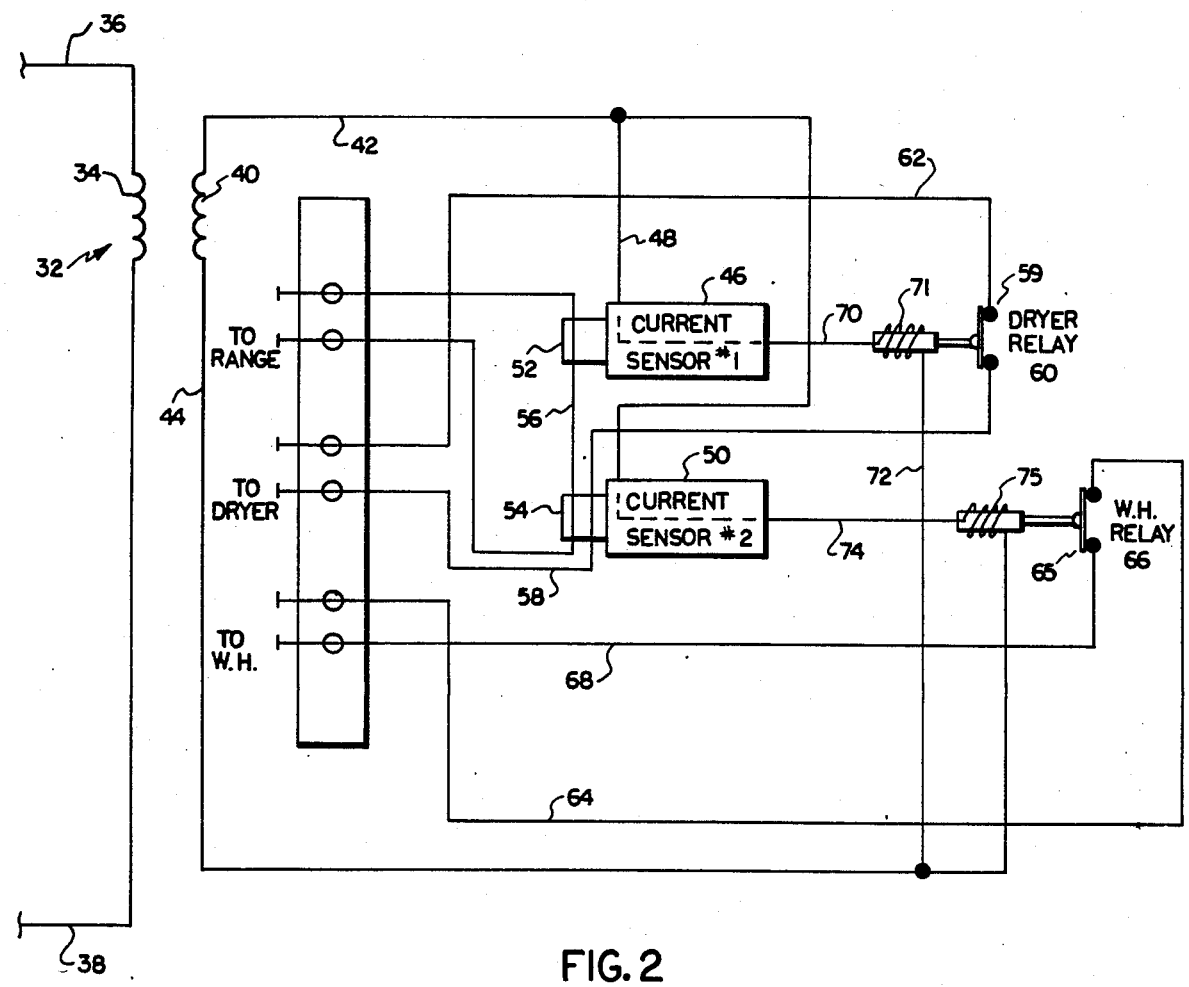
FIG. 2 is a schematic circuit diagram of one embodiment of the present invention.

Referring now to FIG. 2, electrical circuitry within the junction box 12 is shown. A step-down transformer 32 includes an input side 34 connected across lead lines 36, 38 disposed within the cable 24. The transformer 32 includes an output side 40. The output side 40 is connected at its ends to lead lines 42, 44. The lines 36, 38 have a potential difference of 120 volts AC. The output side 40 has a potential difference of 24 volts AC. An acceptable transformer 32 is manufactured by the Dayton Electric Manufacturing Company of Chicago, IL Model No. 4X746B.

A current sensor 46 is connected to the lead line 42 by means of a lead 48. A second current sensor 50 is connected directly to the lead line 42. The current sensor 46 includes a U-shaped bracket 52 spaced from one end of the current sensor 46. The current sensor 50 similarly has a U-shaped bracket 54. A lead line 56 extends through both brackets 52, 54. The lead 56 comprises one leg of a 240 volt line that is connected to the electric range by way of the cable 18 which, in turn, splices at the panel 16 to the cable 26. Similarly, a lead 58 passes through the bracket 54 (but not the bracket 52). The other end of the lead 58 is connected to one of the normally closed contacts 59 of a power relay 60 (hereafter referred to as the "dryer relay"). The other contact of the dryer relay 60 is connected to a lead 62 which, in turn, is connected to the heating element of the dryer. The leads 58, 62 comprise one leg of a 240 volt line that is connected to the dryer by way of the cable 20 which, in turn, splices at the panel 16 to the cable 28.

A lead 64 is connected to one of the normally closed contacts 65 of a power relay 66 (hereafter referred to as the "water heater relay"). The other contact of the water heater relay 66 is connected to a lead 68. The leads 64, 68 comprise one leg of a 240 volt line that is connected to the water heater by way of the cable 22 which, in turn, splices at the panel 16 to the cable 30.

The current sensor 46 includes a second lead 70 connected to the coil 71 of the dryer relay 60. The other end of the coil 71 is connected to the lead 44 by means of a lead 72. The current sensor 50 also includes a second lead 74 which is connected to the coil 75 of the water heater relay 66. The other end of the coil 75 is connected directly to the lead 44.

Suitable current sensors 46, 50 can be obtained from Research Products Corporation, Madison, WI Model 50. The current sensors 46, 50 each include a normally open electronic relay which trips in response to a current of about four amperes flowing in the lines 56, 58 for a period of approximately 30 milliseconds. Upon detecting such a current flow, the relay is energized, establishing a flow of current between the leads 48, 70 or the leads 42, 74, as the case may be. The relay de-energizes when current in the leads 56, 58 drops below the trip point for longer than approximately ½ second.

The relays 60, 66 can be obtained from the Dayton Electric Manufacturing Company, Chicago, IL Model No. 3X744. Whenever 24 volts AC flows through the leads 70, 72 or the leads 44, 74, the normally closed relay contacts 59, 65 will be opened. The relays 60, 66 can accommodate 30 amps at up to 300 volts.

In operation, the current sensors 46, 50 will be actuated whenever the electric range is being used due to a flow of electrical current through the lead 56. In turn, the dryer relay 60 and the water heater relay 66 will be actuated so as to prevent the flow of current through the leads 58, 62 and 64, 68, respectively. Under these circumstances, both the dryer and the water heater will be disabled. Because operation of the range causes both the dryer and the water heater to be disabled, the range is accorded highest priority and the dryer and water heater are accorded secondary priorities.

The current sensor 50 will be actuated whenever the dryer is being operated due to current flowing through the lead 58. In turn, the water heater relay 66 will be actuated. The flow of electrical current through the leads 64, 68 will be disrupted, thereby disabling the water heater. Because operation of the dryer causes the water heater to be disabled, the dryer has been assigned a higher priority than the water heater.

THE FIRST ALTERNATIVE EMBODIMENT

Figure 3:
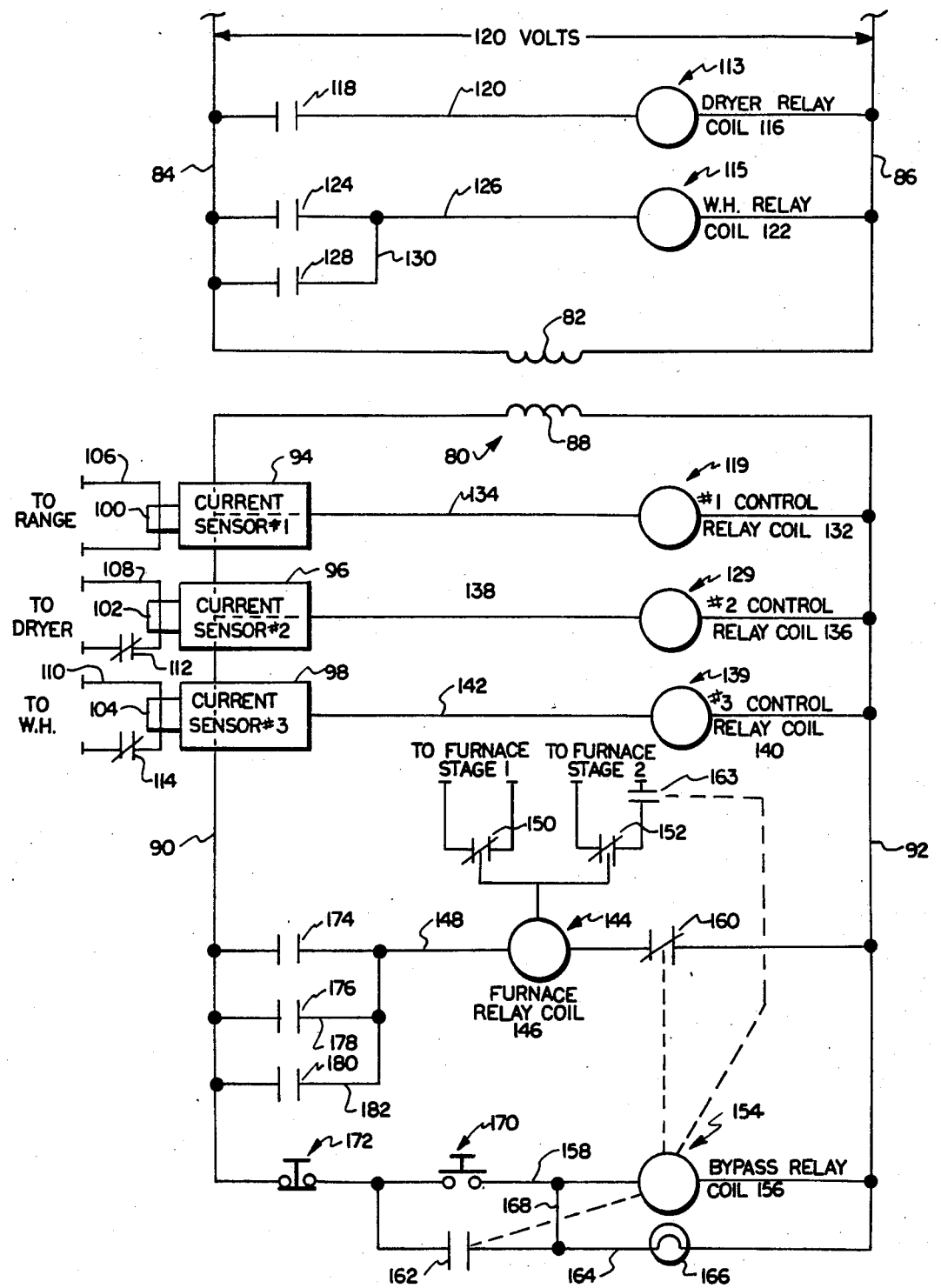
FIG. 3 is a schematic circuit diagram of an alternative embodiment of the present invention.

A first alternative embodiment of the invention is illustrated in FIG. 3. This embodiment of the invention operates similarly to the first-described embodiment, but it contains additional components which provide enhanced operational capabilities.

As in the first-described embodiment, a step-down transformer 80 includes an input side 82 connected to lead lines 84, 86 which establish a potential difference of 120 volts AC. The transformer has an output side 88 from which lead lines 90, 92 extend. The transformer 80 is identical to the transformer 32 described previously.

In a manner similar to the first-described embodiment, the embodiment of FIG. 3 includes current sensors 94, 96, 98, each having its own U-shaped bracket 100, 102, 104, respectively. A lead line 106 from one of the conducting legs of the range extends through the bracket 100. A lead line 108 from one of the conducting legs of the dryer extends through the bracket 102, while a lead line 110 from one of the conducting legs of the water heater extends through the bracket 104. Normally closed contacts 112 of a power relay 113 (hereafter the "dryer relay") are connected in the line 108. Normally closed contacts 114 of a power relay 115 (hereafter the "water heater relay") are connected in the line 110.

The dryer relay 113 includes a relay coil 116 connected in series with normally open contacts 118 of a first control relay 119 by means of a lead line 120. The water heater relay 115 includes a relay coil 122 connected in series with normally open contacts 124 of the first control relay 119 by means of a lead line 126. Normally open contacts 128 of a second control 129 relay are connected in parallel with the contacts 124 by means of a lead line 130. The lead lines 120, 126 and 130 are connected across the lead lines 84, 86 on the input side 82 of the transformer 80.

The first control relay 119 includes a relay coil 132 connected to the current sensor 94 by means of a lead line 134. The second control relay 129 includes a relay coil 136 connected in series with the current sensor 96 by means of a lead line 138. A third control relay 139 includes a relay coil 140 connected in series with the current sensor 98 by means of a lead line 142. The current sensors 94, 96, 98 are connected in parallel with each other in the lead line 90, and are connected at their other end to the lead line 92 by means of the lead lines 134, 138, 142 and the relay coils 132, 136, 140.

A control relay 144 (hereafter the "furnace relay") includes a relay coil 146 connected across the lead lines 90, 92 by means of a lead 148. The furnace relay 144 also includes normally closed relay contacts 150, 152. The contacts 150 are connected in series with the first stage of an electric furnace control circuit, while the contacts 152 are connected in series with the second stage of the furnace control circuit. The control circuits are part of the internal wiring within the electric furnace and usually operate at 24 volts.

A control relay 154 (hereafter the "bypass relay") includes a relay coil 156 connected across the lead lines 90, 92 by means of a lead 158. The bypass relay 154 also includes a pair of normally closed contacts 160 disposed in the lead 148, and a pair of normally open contacts 162 disposed in a lead 164. An optional pair of normally open contacts 163 can be disposed in series with the contacts 152. The lead 164 is connected at one end to the lead 158, and is connected at its other end to the lead 92. An indicator light 166 is connected in series with the contacts 162 in the lead 164. The leads 158, 164 are connected by a lead 168. A normally open, manually actuated, momentary contact switch 170 is disposed in the lead 158, as is a normally closed, manually actuated, momentary reset switch 172.

The first control relay 119 includes a pair of normally open contacts 174 which are connected in the lead 148. The second control relay 129 includes a pair of normally open contacts 176 which are connected in parallel with the contacts 174 by means of a lead 178. The third control relay 139 includes a pair of normally open contacts 180 which are connected in parallel with the contacts 174, 176 by means of a lead line 182.

The current sensors 94, 96, 98 are substantially identical to the current sensors 46, 50. The dryer relay 113 and the water heater relay 115 are subtantially identical to the dryer relay 60 and the water heater relay 66. The furnace relay 144 is substantially identical to the control relays 119, 129, 139. The bypass relay 154 is similar to the control relays 119, 129, 139, except that the contacts 162 are normally open, instead of normally closed. A relay suitable for use as the control relays 119, 129, 139, 154 is commercially available from the Dayton Electric Manufacturing Company of Chicago, IL Model No. 5XA37.

OPERATION OF THE FIRST ALTERNATIVE EMBODIMENT

In operation, whenever the range is in use, electrical current will flow through the lead 106. In turn, the current sensor 94 will detect the flow of current. An output signal will be sent to the coil 132 of the first control relay 119 by way of the lead 134. In turn, the normally open contacts 118, 124 will be closed, thus completing a high voltage circuit through the coils 116, 122 of the dryer relay 113 and the water heater relay 115, respectively. The contacts 112, 114 associated with the dryer relay 113 and the water heater relay 115 will be opened, thus disabling both the dryer heating element and the water heater. Further, the contacts 174 will be closed, completing a low voltage circuit through the furnace relay coil 146 by way of the lead 148. Upon activation of the furnace relay 144 in this manner, the normally closed contacts 150, 152 will be opened, thus disabling both stages of the furnace. From the foregoing description, it will be apparent that the range has been assigned the highest priority and operation of the range causes all other controlled appliances to be disabled.

In a manner similar to operation of the range, if the dryer is being operated, the current sensor 96 will detect the flow of current through the lead 108. Subsequently, a flow of current will be established through the coil 136 of the second control relay 129 by way of the lead 138. The normally open contacts 128, 176 will be closed, thereby establishing a high voltage flow of electricity through the coil 122 by way of the lead 126 and a low voltage flow of electricity through the coil 146 by way of the leads 148, 182. Activation of the coils 122, 146 will cause the normally closed contacts 114, 150, 152 to be opened, thereby disabling both the water heater and the furnace. From the foregoing description, it will be apparent that the dryer has been assigned a secondary priority relative to the range, but a higher priority than the water heater and the furnace.

When the water heater is being operated, the current sensor 98 will detect a flow of electricity through the lead 110. Subsequently, the coil 140 of the third control relay 139 will receive electrical current by way of the lead 142. In turn, the normally open contacts 180 will be closed, and the coil 146 of the furnace relay 144 will receive a flow of electricity by way of the leads 148, 182. The normally closed contacts 150, 152 will be opened so as to disable the electric furnace. Based on the foregoing description, it is apparent that the water heater has been assigned a third level of priority and the furnace has been assigned a fourth level of priority.

The bypass relay 154 is provided for those instances where it is desired that the disabling function of the furnace relay 144 not be available. In normal operation, the normally open contacts 162 and the normally open switch 170 preclude activation of the bypass relay 154. Whenever it is desired to override the furnace-disabling function of the relay 144, the switch 170 is pushed. A flow of electricity is established through the relay coil 156 by way of the lead 158. Subsequently, the normally closed contacts 160 are opened, and the normally opened contacts 162 are closed. The now-opened contacts 160 preclude activation of the furnace relay 144. The now-closed contacts 162 provide that a flow of electricity will be maintained through the relay coil 156 by way of the leads 158, 164, 168. The flow of electricity through the lead 164 also illuminates the light 166 so as to provide a signal to the operator that the bypass relay 154 is in operation. Whenever it is desired to override the bypass relay 154, the switch 172 is pushed. This causes the flow of electricity through the leads 158, 164, 168 to cease. In turn, the contacts 160, 162 will return to their normal positions.

The first alternative embodiment also can be arranged to provide even more versatility. For instance, it is possible to provide the bypass relay 154 as a three pole relay having three sets of contacts 160, 162 and a pair of normally closed contacts 163 connected in series with the normally closed furnace relay contacts 152. Whenever the bypass relay 154 is energized, the contacts 150, 152 would be returned to their normally closed position. The normally closed contacts 163 would be opened so as to keep the second stage heating elements in the electric furnace from being re-energized. The effect of this circuitry would be to minimize the demand created by the electric furnace during periods when any one of the range, dryer, or water heater already is creating a relatively high demand. However, when any one of the range, dryer, or water heater is not in use, it is possible to once again have full heat (both stages) if that is desired. An optional, auxiliary manual bypass control switch could serve as a parallel path to provide full heat, if desired.

THE SECOND ALTERNATIVE EMBODIMENT

Figure 4:
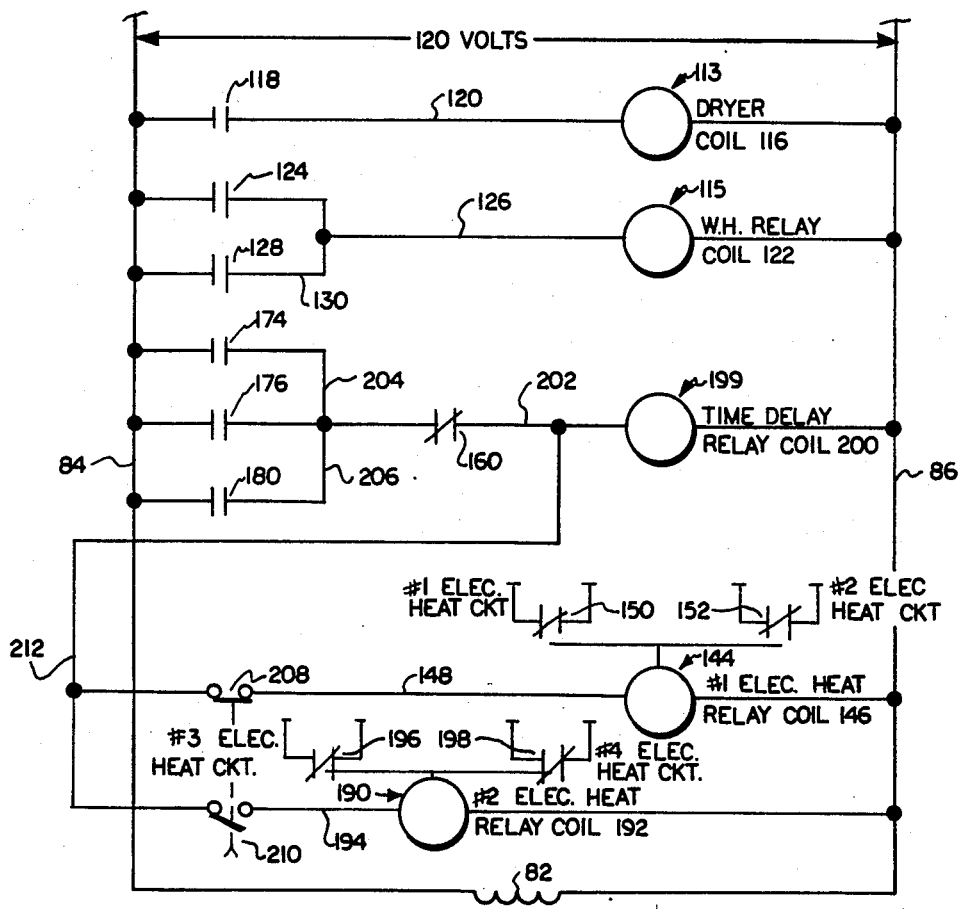
FIG. 4 is a schematic circuit diagram of another alternative embodiment of the present invention.
Figure 4:
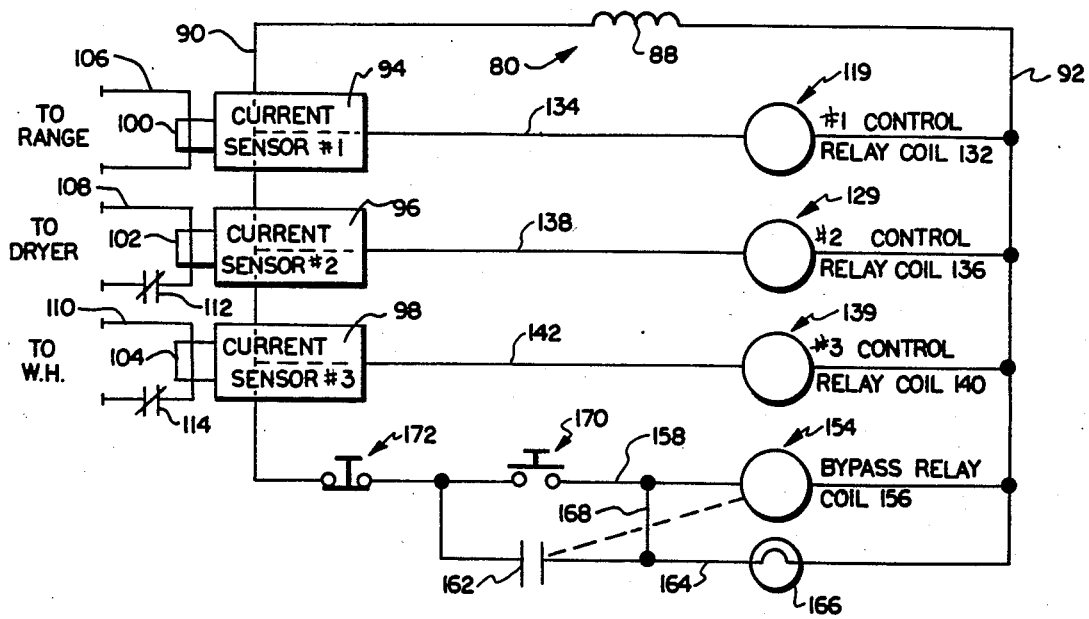

Referring to FIG. 4, a second alternative embodiment of the invention is illustrated. The second alternative embodiment includes a number of components that are identical to those used in the first alternative embodiment. The same reference numerals will be used to identify those components having the same structure and function in both the first and second alternative embodiments.

In the second alternative embodiment, electric baseboard heat or ceiling cable heat is provided. Up to eight circuits can be employed. For the sake of simplicity, only four circuits will be described, it being understood that additional circuits, if any, can be operated in the same manner as those described by the addition of suitable relays. The first two circuits are controlled by the furnace relay 144 described previously, and the second two circuits are controlled by a second double pole 190. The relay 190 includes a coil 192 connected in a lead 144 which in turn is connected to the lead line 86. The relay 190 also includes a pair of normally closed contacts 196, 198 which are connected in series with each of the third and fourth heating circuits. The furnace relay 144 also is connected to the lead 86 by means of the lead 148.

The second alternative embodiment includes a repeat cycle time delay control relay 199 (hereafter the "time delay relay") having a relay coil 200 connected across the lead lines 84, 86 by means of a lead 202. The normally closed contacts 160 of the bypass relay 154 are connected in series with the relay coil 200 in the line 202, as are the normally open contacts 176 of the second control relay 129. The normally open contacts 174, 180 of the first and third control relays 119, 139, respectively, are connected in parallel with the contacts 176 across the leads 84, 86 by means of leads 204, 206. The time delay relay 199 includes a pair of normally closed contacts 208 connected in series with the relay coil 146 in the line 148 and a pair of normally open contacts 210 connected in series with the relay coil 192 in the line 194. The other sides of the contacts 208, 210 are connected to each other and the lead 202 by means of a lead 212. The contacts 208, 210 are part of a "double-throw" mechanism, connected such that the closing of one causes the other to open, and vice versa.

A suitable time delay relay 199 is available from National Controls Corp., Lombard, IL Model CKK-300-461. The time delay relay operates on an input of 120 volts AC, with a switching function operating within the range of 3-300 seconds. The relay 199 is adjustable within that range by the operator, and five minutes typically is selected as an acceptable period by the operator or installer.

OPERATION OF THE SECOND ALTERNATIVE EMBODIMENT

In operation, the dryer and water heater are disabled in the same manner as with the first alternative embodiment. The electric heat is disabled differently. Whenever the range, dryer, or water heater are operated, the first, second, and third control relays 119, 129, 139 will cause one of the contacts 174, 176, 180 to be closed. A flow of electricity will be established through the lead 202, thereby activating the relay coil 200. Current also will flow through the lines 148, 194. In turn, the contacts 208, 210 will be cycled between their open and closed positions for such a period of time as has been selected by the operator.

Whenever the contacts 208 are closed, a flow of electricity will be established through the lead 148, thereby activating the relay coil 146. In turn, the normally closed contacts 150, 152 will be opened so as to disable two circuits of electric baseboard or ceiling cable heat.

Whenever the contacts 210 are closed, a flow of electricity will be established through the relay coil 192 by way of the lead 194. In turn, the normally closed contacts 196, 198 will be opened, thereby disabling two more circuits of electric heat.

Based on the foregoing description, it will be apparent that, whenever any one of the range, dryer, or water heater are operated, various electric heat circuits will be disabled on an alternating basis. Operation of the heating circuits in this manner will prevent "cold spots" from developing.

The bypass relay 154 and its associated circuitry operate as in the first alternative embodiment. Because the contacts 160 are disposed in the lead 202, the relay coil 200 is disabled, thereby overriding the disabling function of both of the relays 144, 190.

As will be apparent from reviewing the specification and the drawings, the present invention provides an exceedingly inexpensive and effective technique for managing energy consumption among a group of electrical loads having assigned priorities. The simplest embodiment of the invention is especially effective in managing electrical consumption in a residence by assigning priorities to only three electrical loads. The use of sophisticated electronic equipment is avoided, with the result that inexpensiveness and reliability are enhanced. The use of the high voltage power relays and low voltage control relays in the first alternative embodiment provides a more positive control function at only a modest increase in expense. Controlling the furnace in the manner provided adds an extra degree of versatility. The alternating electric heat control and the time delay employed with the second alternative embodiment likewise add a great degree of versatility.

Although the invention has been described in its preferred form with a certain degree of particularly, it will be understood from the foregoing desription that various changes in the details of construction and arrangement of components can be resorted to without departing from the true spirit and scope of the invention as hereinafter claimed. It is intended that the patent shall cover, by suitable expression in the appended claims, whatever degree of patentable novelty exists in the invention disclosed.

What is claimed is:

1. An energy management system for controlling a plurality of electrical loads, the electrical loads having first, second, and third priorities of use, respectively, comprising:
   first sensing means for sensing currenrt flow in the first electrical load and for providing an output signal in response thereto;
   second sensing means for sensing current flow in the first electrical load or the second electrical load and for providing an output signalin response thereto;
   first interrupting means for interrupting current flow in the second electrical load, the first interrupting means being electrically connected to the first sensing means and being actuated upon receiving an output signal from the first sensing means;
   second interrupting means for interrupting current flow in the third electrical load, the second interrupting means being electrically connected to the second sensing means and being actuated upon receiving an output signal from the second sensing means; and
   a step-down transformer, the output side of the transformer being electrically connected to each of the sensing means and the interrupting means.

2. The system of claim 1, wherein the first and second sensing means are electronic relays.

3. The system of claim 1, wherein the first and second interrupting means are relays.

4. The system of claim 1, wherein the first electrical load is as conventional home range, the second electrical load is a conventional home clothes dryer, and the third electrical load is a conventional home water heater.

5. An energy management system for controlling a plurality of electrical loads, each load being assigned a priority of use, comprising:
first sensing means in the form of an electronic relay for sensing current flow in the first electrical load and for providing an output signal in response thereto;
second sensing means in the form of an electronic relay for sensing current flow in the second electrical load and for providing an output signal in response thereto;
third sensing means in the form of an electronic relay for sensing current flow in the third electrical load and for providing an output signal in response thereto;
first control means for receiving an output signal from the first sensing means and for providing an output signal in response thereto;
second control means for receiving an output signal from the second sensing means and for providing an output signal in response thereto;
third control means for receiving an output signal from the third sensing means and for providing an output signal in response thereto;
first interrupting means for interrupting current flow in the second electrical load, the first interrupting means being electrically connected to the first control means and being uutuated upon receiving an output signal from the first control means;
second interrupting means for interrupting current flow in the third electrical load, the third interrupting means being electrically connected to both the first and second control means and being actuated upon receiving an output signal from either the first or second control means;
third interrupting means for interrupting current flow in the fourth electrical load, the third interrupting means being electrically connected to the first, second, and third control means and being actuated upon receiving an output signal from any one of the first, second, or third control means;
the first, second, and third control menas being in the form of relays having coils in series with their associated sensing means and having normally open contacts in series with their associated interrupting means;
the first, second, and third interrupting means being in the form of relays having coils in series with the contacts of their associated control relays and having normally closed contacts in series with their associated electrical loads; and
a step-down transformer, the control means being connected across the output side of the transformer, and the interrupting means being connected across the input side of the transformer.

6. The system of claim 5, further including a manually operated control means electrically connected to a predetermined interrupting means for disabling operation of the predetermined interrupting means.

7. The system of claim 6, further including signal means for alerting the operator that the manually operated control means has been actuated.

8. The system of claim 5, wherein the first electrical load is a conventional home range, the second electrical load is a conventional home clothes dryer, the third electrical load is a conventional home water heater, and the fourth electrical load is a conventional home furnace.

9. The system of claim 5, further including repeat cycle time delay means for interrupting current flow alternately in predetermined electrical loads, the repeat cycle time delay means being electrically connected to the control means associated with the predetermined electrical loads and being actuated upon receiving an output signal from the control means associated with the predetermined electrical loads.

10. The system of claim 9 wherein the repeat cycle time delay means is a relay having its coil in series with the control means associated with the predetermined electrical loads and having contacts in series with the predetermined electrical loads, the contacts being alternately opened and closed upon activation of the repeat cycle time delay relay coil.

11. An energy management system for controlling a plurality of electrical loads, the electrical loads having first, second, third, and fourth priorities of use, respectively, comprising:
a first current sensor for sensing current flow in the first electrical load and for providing an output signal in response thereto;
a second current sensor for sensing current flow in the second electrical load and for providing an output signal in response thereto;
a third current sensor for sensing current flow in the third electrical load and for providing an output signal in response thereto;
a first control relay, the coil of the first control relay being actuated upon receiving an ouptut signal from the first current sensor, the first control relay further including three pairs of normally open contacts;
a second control relay, the second control relay receiving the output signal from the second current sensor, the second control relay further including two pairs of normally open contacts;
a third control relay, the third control relay receiving the output signal of the third current sensor, the third control relay further including a pair of normally open contacts;
a first power relay, the coil of the first power relay being connected in series with one of the normally open contacts of the first control relay, the first power relay including a pair of normally closed contacts in series with the second electrical load;
a second power relay, the second power relay being connected in series with normally open contacts of the first and second control relays, the second power relay having a pair of normally closed contacts in series with the third electrical load; and
a third power relay, the third power relay being connected in series with normally open contacts of the first, second, and third power relays, the third control relay having a pair of normally closed contacts in series with the fourth electrical load.

12. The system of claim 11, further comprising a fourth control relay, the coil of the fourth control relay being in series with a manually operated, normally open switch, the fourth control relay having a pair of normally closed contacts in series with the coil of the third power relay.

13. The sytem of claim 12, wherein:
the fourth control relay includes a pair of normally open contacts in parallel with the coil of the fourth control relay, the normally open contacts being electrically connected to one side of the coil of the fourth control relay; and a manually operated, normally closed switch is in series with the coil of the fourth control relay.

14. The system of claim 11, wherein the first electrical load is a conventional home range, the second electrical load is a conventional home clothes dryer, the third electrical load is a conventional home water heater, and the fourth electrical load is a conventional home electric furnace.

15. The system of claim 11, further comprising:
a fourth power relay, the fourth power relay including normally closed contacts in series with a fifth electrical load; and
a repeat cycle time delay control relay, the repeat cycle time delay control relay having a coil connected in parallel with the contacts from the first, second, and third control relays, the repeat cycle time delay control relay having a pair of contacts, one of which is in series with the coil of the third power relay, and the other of which is in series with the coil of the fourth power relay, the contacts of the repeat cycle time delay relay being opened and closed alternately upon activation of the repeat cycle time delay relay coil.

16. The system of claim 15, wherein the first electrical load is a conventional home range, the second electrical load is a conventional home clothes dryer, the third electrical load is a conventional home water heater, the fourth electrical load is a portion of the heating circuitry of a conventional home electric furnace, and the fifth electrical load is the remaining portion of the heating circuitry of the electric furnace.

* * * * *

UNITED STATES PATENT AND TRADEMARK OFFICE
CERTIFICATE OF CORRECTION

PATENT NO. : 4,695,738

DATED : September 22, 1987

INVENTOR(S) : Daniel Wilmot

It is certified that error appears in the above-identified patent and that said Letters Patent are hereby corrected as shown below:

Column 8, line 42 -- "currenrt" should be "current"

Column 8, line 47 -- "signalin" should be "signal in"

Column 8, line 68 -- "as" should be "a"

Column 9, line 31 -- "uutuated" should be "actuated"

Signed and Sealed this

Twelfth Day of January, 1988

Attest:

*Attesting Officer*

DONALD J. QUIGG

*Commissioner of Patents and Trademarks*